US008086514B2

(12) United States Patent
Wallman

(10) Patent No.: US 8,086,514 B2
(45) Date of Patent: Dec. 27, 2011

(54) METHOD AND APPARATUS FOR REBALANCING AN INVESTMENT PORTFOLIO USING A PORTFOLIO INVESTMENT SYSTEM

(75) Inventor: Steven M. H. Wallman, Great Falls, VA (US)

(73) Assignee: FOLIOfn, Inc., McLean, VA (US)

( * ) Notice: Subject to any disclaimer, the term of this patent is extended or adjusted under 35 U.S.C. 154(b) by 0 days.

(21) Appl. No.: 12/378,495

(22) Filed: Feb. 17, 2009

(65) Prior Publication Data
US 2009/0254490 A1    Oct. 8, 2009

(51) Int. Cl.
*G06Q 40/00* (2006.01)
(52) U.S. Cl. .................................. 705/36 R
(58) Field of Classification Search .............. 705/35–45, 705/36 R
See application file for complete search history.

(56) References Cited

U.S. PATENT DOCUMENTS

| 7,149,713 | B2 * | 12/2006 | Bove et al. | 705/36 R |
|---|---|---|---|---|
| 2003/0110113 | A1 * | 6/2003 | Martin | 705/36 |
| 2005/0010516 | A1 * | 1/2005 | Ivanov et al. | 705/36 |
| 2005/0154658 | A1 * | 7/2005 | Bove et al. | 705/35 |

OTHER PUBLICATIONS

Funds' New Rival: Web Sites for Trading. Kathy Bergen, Tribune Staff Writer. Chicago, Ill.: Jul. 30, 2000. p. 3.*
Have It Your Way New Internet Services Let Investors Build and Trade Personalized Portfolios. Karen Demato, The Wall Street Journal. Chicago Tribune. Chicago, Ill.: Nov. 2, 2000. p. 3.*
Personalized Portfolios for Do-it-yourself Investors. Jerry Morgan, Newsday. Sun Sentinel. Fort Lauderdale: Oct. 2, 2000. p. 18.*
Do-it-yourself Stock Services a Low Cost Fund Alternative. Charles Jaffe. The Sun. Baltimore, Md.: Sep. 24, 2000. p. 3.c.*
Build Your Portfolio but Avoid Large Fees Through Foliofn, Investors Can Buy 150 Stocks and the Tab Only Comes to $295 a Year. Miliam Hill, Philadelphia Inquirer. Orlando Sentinel. Orlando, Fla.: Sep. 3, 2000. p. H.1.*
Constantinides, George M. Journal of financial and Quantitative Analysis, vol. 14, Issue 2 (Jun. 1979), p. 443-450.*

* cited by examiner

*Primary Examiner* — Richard C Weisberger
(74) *Attorney, Agent, or Firm* — Michael P. Fortkort; Michael P. Fortkort PC

(57) ABSTRACT

A computer based portfolio manager system enables a user to create and manage a portfolio of investments. Users can create multiple sub-portfolios, termed folios, within their overall investment portfolio. Each of these folios can be created by the user or selected from multiple preset folios. One of the possible preset folios includes a manager's recommended folio. This folio is regularly updated, thereby indicating buy and sell recommendations of the manager. A user can balance his or her folio in accordance with the manager's revisions by investing additional capital in some securities and selling others. To prevent undesirable tax effects, a user can move securities from the manager's folio to a holding folio established by the user rather than selling the securities. This enables a user to maintain a folio in the proportions recommended by the manager. The system also enables the folio to be continually rebalanced, while avoiding undesirable tax effects.

20 Claims, 6 Drawing Sheets

METHOD AND APPARATUS FOR REBALANCING AN INVESTMENT PORTFOLIO USING A PORTFOLIO INVESTMENT SYSTEM

RELATED APPLICATIONS

This application claims priority to U.S. application Ser. No. 10/306,625, filed on Nov. 27, 2002 by the same inventor and with the same title.

The present invention is related to U.S. patent application Ser. No. 09/038,158, entitled "Method and Apparatus for Enabling Smaller Investors or Others to Create and Manage a Portfolio of Securities or Other Assets or Liabilities on a Cost Effective Basis", filed on Mar. 11, 1998. The present invention is also related to U.S. patent application Ser. No. 09/139,020, entitled "Method and Apparatus for Enabling Smaller Investors or Others to Create and Manage a Portfolio of Securities or Other Assets or Liabilities on a Cost Effective Basis", filed on Aug. 24, 1998. The present invention is also related to U.S. patent application Ser. No. 09/339,299, entitled "Method and System for Investing in a Group of Securities that are Selected Based on the Aggregated, Individual Preferences of Plural Investors", filed on Jun. 24, 1999. Each of these applications was filed by the inventor of the present invention. U.S. patent application Ser. Nos. 09/038, 158, 09/139,020, and 09/339,299 are each hereby incorporated by reference as if repeated herein in their entirety, including the drawings.

BACKGROUND OF THE INVENTION

The present invention relates generally to methods and systems for facilitating investments. More specifically, the present invention relates to a method and system for facilitating investments over a computer network using a computer-based system for creating, managing, and trading user specifiable portfolios of investments.

The above-mentioned related applications disclose, inter alia, embodiments of systems, methods, and apparatuses for enabling investors, both large and small, to create, manage, and trade portfolios of investments. In certain embodiments, each investor is provided the ability to select and purchase various investment vehicles as part of their portfolio. Among other things, investors are provided the ability to select portfolios of securities based on their risk/reward characteristics relative to the market, their desire to invest in particular types of investments, and other criteria. This provides an easy way for even relatively novice investors to select diversified portfolios of securities or other investments.

However, portfolio investing is based on the concept that one selects target weights for each investment and then invests an amount of money consistent with the target weights. Once selected, the actual weights vary from the target weights due to gains and losses of the various investments. However, rebalancing without care can cause taxable events, even for small amounts of money, which could overwhelm an individual investor in terms of tax preparation and related accounting.

The present invention is therefore directed to the problem of rebalancing one's investments using a portfolio investment system while controlling inadvertent taxable events.

SUMMARY OF THE INVENTION

The present invention solves these and other problems by inter alia providing a method for rebalancing a portfolio of investments in accordance with preset ratios or to rebalance based on changes in a recommended portfolio. The rebalancing technique of embodiments of the present invention can be performed in a single step, or over a series of steps representing a series of periodic payments, thereby enabling a small periodic investor to rebalance his or her portfolio in a series of steps without requiring a sale of any investments, for example, to avoid possible taxable events.

While the embodiments herein discuss investing, the same general concepts are applicable for negative investments (i.e., withdrawals). Rebalancing to account for removal of assets from specific investments can be done in the same manner as set forth herein.

An exemplary embodiment of a method for implementing the rebalancing technique of the present invention determines the investment or investments having a largest under-represented difference from a user's specified ratio. The method then first allocates funds from a payment to this investment or these investments until its or their under-represented difference(s) equals a previous second largest under-represented difference. If any funds remain from the payment, the method allocates any remaining funds to the new largest equal under-represented differences. The process continues repeating the previous step until all the under-represented differences are equal. If the under-represented differences are zero, then the portfolio is balanced. If the under-represented differences are all equal but non-zero, the method allocates any remaining funds in proportion to the relative ratios of the investments having under-represented differences. The above method is particularly suitable to implementation on a computer, as it is an iterative process that can be performed in a loop having a test to determine when the loop ends.

DETAILED DESCRIPTION

Figure 1:
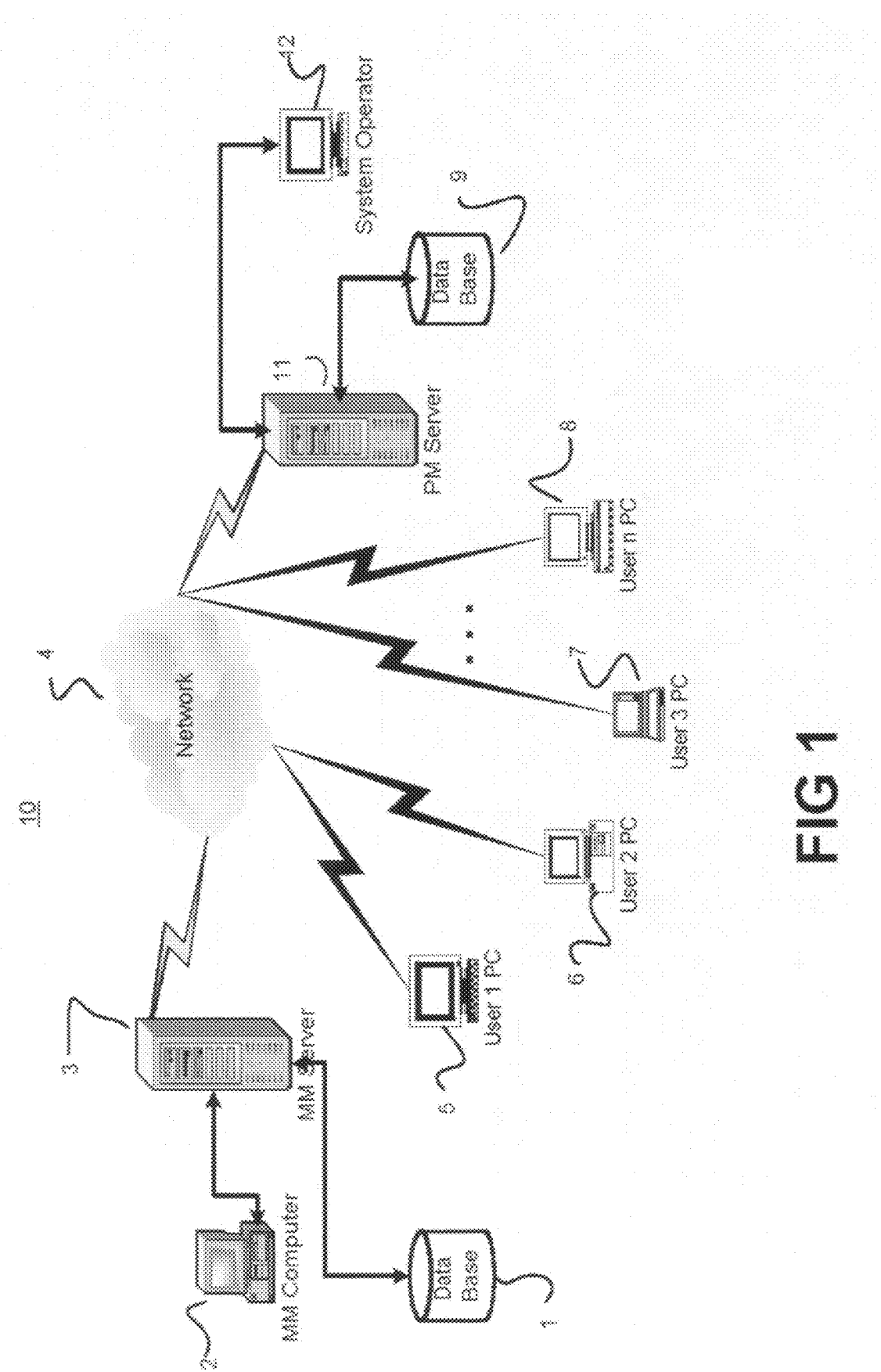
FIG. 1 depicts an exemplary embodiment of a portfolio manager according to one aspect of the present invention.

Any reference herein to "one embodiment" or "an embodiment" means that a particular feature, structure, or characteristic described in connection with the embodiment is included in at least one embodiment of the invention. The appearances of the phrase "in one embodiment" in various places herein are not necessarily all referring to the same embodiment.

As used herein, the phrase "asset/right/liability" refers to any tradable commodity or item of value in which there exists a market, however small, for trading. This includes both instruments and non-instruments. Examples of instruments include: securities, equities, bonds, futures, mutual funds, derivatives, currencies (both national and foreign), commodities, insurance contracts, mortgages, hedge funds, investment clubs, high-yield debt, foreign debt, convertible debt, notes, pollution rights, development rights, leases, loans, real estate investment trusts, etc. Examples of non-instruments include without limitation: airline reservations, hotel reservations, time share rights, golf tee times, country club memberships, antiques, telecommunications bandwidth, factory capacity, real estate, consumer coupons, airline miles, hotel miles, consumer reward program credits, etc. Although the computer-based system of the present invention can be used for any asset, right, and/or liability in which there exists a market for trading, however, small, for brevity the discussion herein relates primarily to its use in connection with tradable instruments or securities, and particularly to stocks. The phrase "assets/rights/liabilities" refers to any collection of assets/rights/liabilities.

As used herein, the phrase "manager" refers to any person, other than the user, who manages the portfolios in which the user invests. A manager can be professional, as in the case of a professional asset manager employed by an asset management firm or by the system proprietor, or can be an amateur, as in the case of a manager who does not receive compensation. A manager can manage the portfolios to maximize their investment return, or to obtain other objectives, such as providing a portfolio of securities issued by companies that the manager believes further social goals (for example, an environmental organization could manage a portfolio of securities issued by companies that are environmentally friendly). A manager can be active, as in the case of a manager who participates directly in the creation and periodic or continual revision of portfolios, or passive, as in the case of a manager who simply provides and periodically or continually revises a list of investments to the public which list is then converted into a portfolio of investments by the system proprietor without any direct participation by the manager.

Embodiments of the present invention provide a method for rebalancing a portfolio of investments in accordance with preset ratios or to rebalance based on changes in a recommended portfolio. The rebalancing technique of embodiments of the present invention can be performed in a single step, or over a series of steps representing a series of periodic payments, thereby enabling a small periodic investor to rebalance his or her portfolio in a series of steps without requiring a sale of any investments, for example, to avoid possible taxable events.

While the embodiments herein discuss investing, the same general concepts are applicable for negative investments (i.e., withdrawals). Rebalancing to account for removal of assets from specific investments can be done in the same manner as set forth herein.

An exemplary embodiment of a method for implementing the rebalancing technique of the present invention determines the investment or investments having a largest under-represented difference from a user's specified ratio. The method then first allocates funds from a payment to this investment or these investments until its or their under-represented difference(s) equals a previous second largest under-represented difference. If any funds remain from the payment, the method allocates any remaining funds to the new largest equal under-represented differences. The process continues repeating the previous step until all the under-represented differences are equal. If the under-represented differences are zero, then the portfolio is balanced. If the under-represented differences are all equal but non-zero, the method allocates any remaining funds in proportion to the relative ratios of the investments having under-represented differences. The above method is particularly suitable to implementation on a computer, as it is an iterative process that can be performed in a loop having a test to determine when the loop ends.

The computer-based portfolio system, to which the present invention is applicable, is described in detail in the patent applications mentioned in the related application section herein. Each of these patents is hereby incorporated by reference as if repeated herein in its entirety, including the drawings.

System Overview

The computer-based portfolio manager system enables investors to create, manage, and trade a diversified portfolio of investments, which can be created from among the thousands of publicly traded securities. By selecting a portfolio of individual investments rather than single investments, an investor can take advantage of the modern portfolio theory that suggests one can obtain a better risk-adjusted return in the long run on average by investing in a broader range of investments rather than in a few select investments. The present invention provides this capability to even small investors by enabling them to spread an investment across many assets/rights/liabilities in a cost-effective manner that would otherwise make such diverse investing impractical.

User Interface to Select Investments

As each user can own multiple sub-portfolios (i.e., a grouping of assets/rights/liabilities) in his or her portfolio of investments, the term "folio" will be used to refer to a sub-portfolio that can comprise one's portfolio. Using the present invention, a user can select a "folio" of investments from several available. The user is then able to directly invest an amount of money in this folio. Each folio can be comprised of assets/rights/liabilities, but as mentioned above, for brevity the discussion herein will mainly refer to instruments or securities, such as stocks.

Figure 2:
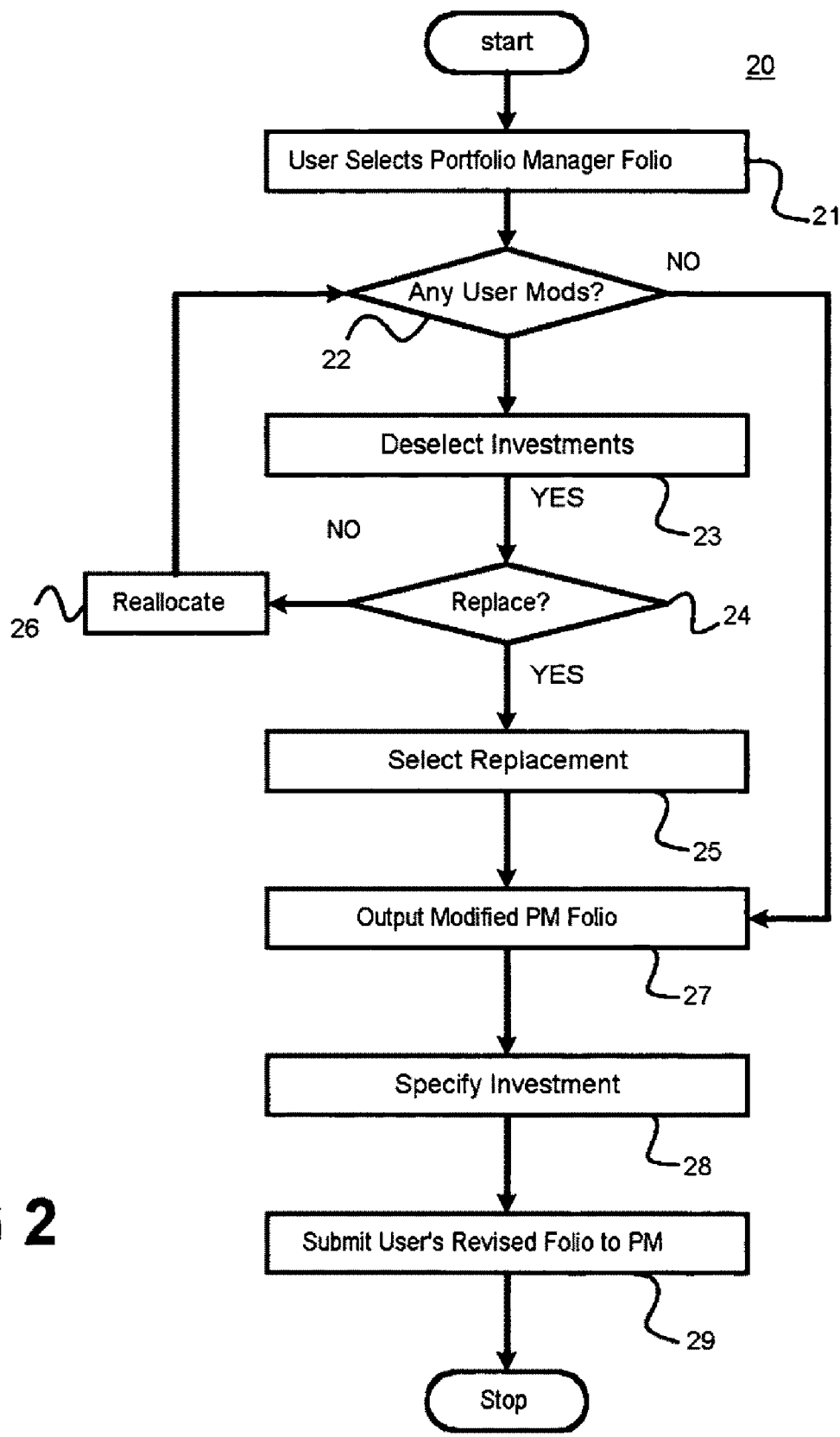
FIG. 2 depicts an exemplary embodiment of a method according to another aspect of the present invention for modifying a recommended folio.

FIG. 2 shows an exemplary embodiment of a process and/or method 20 for modifying a manager's portfolio by a user. At activity 21 the user selects the manager's folio. At activity 22 the user is offered the opportunity to perform any modifications to the manager's folio. Such modifications could be composition modifications measured by, for example, the percentages, ratios, or dollar values of any stock in the folio. Such modifications could also include selection modifications, wherein certain stocks presented in the manager's folio are deselected. If the user does not wish to perform any modifications, the process proceeds to activity 27 and outputs the unmodified folio. If the user does wish to make modifications, at activity 23 the user is permitted to make those modifications.

At activity 24 the user is then provided the option of replacing any stock that is deselected. If the user wishes to replace the deselected stock, at activity 25 the user selects the replacement. If the user does not wish to replace the deselected stock, at activity 26 the user can reallocate the amount of the deselected stock across the remaining stocks. This returns the user to the user modification activity 22. If there are no remaining modifications, the process proceeds to activity 27 and outputs the modified folio to storage. The user's modifications are stored to enable future modifications to any changes that might occur in the manager's folio.

Once the modified folio is created, at activity 28 the user can select the amount of any investment for the entire folio. At activity 29, the folio and the investment amount is then submitted to the portfolio manager system for execution, and the process ends.

As the securities in the manager's folio change based on changes by the manager, the system notifies its users that a revised version of the manager's folio is now available. This notification can occur each time the manager's folio changes, or at other intervals, such as daily, weekly, monthly, and/or quarterly. These changes can occur on a periodic basis, such as quarterly, monthly, weekly, daily, and/or perhaps even hourly, or on a non-periodic basis, and in certain embodiments, always under the control of the manager. A user can then rebalance his investments in accordance with the revised folio in the same manner the user would otherwise rebalance his folio to account for changes in stock valuations, market capitalization, etc.

For example, if a user's folio varied from a manager's revised folio as a result of a change in investment allocation by the manager, the user could rebalance by buying, selling, or both, as discussed below.

If the user wishes to retain securities that the manager wanted to sell to, for example, prevent creating a taxable event, the user could transfer these to a "holding folio" that the user maintains for just such purposes. Moving these to the holding folio enables the user to maintain his managed folio in the proportions set by the manager without having to sell any securities. Alternatively, the user could simply retain these in his folio and continue with a modified folio.

The system can determine how much money must be invested to rebalance the folio in the proportions set by the manager without selling any stocks. The formula to do so resembles that used to rebalance one's folio to the originally specified proportions mentioned below. The total investment (I) to rebalance one's folio to new ratios ($R_i$'s) is:

$$I = \frac{\sum_{i=1}^{n}(R_i P_T - P_i)}{1 - \sum_{i=1}^{n} R_i}$$

Where $P_T$ is the current market value of the user's folio, $P_i$ is the current market value of each of the individual stocks in the user's folio, $R_i$ is the new ratio of the ith stock, and n is the number of stocks currently under-represented relative to their ratio (i.e., the current market value of these stocks relative to the entire folio is less than the specified ratio). The required individual investments to bring up the ratios of the under-represented stocks are:

$$I_i = R_i(P_T + I) - P_i.$$

Thus, a user can rebalance to the new allocations from the manager by investing the amount $I_i$ in the under-represented stocks without requiring a sell. If the new allocation requires divesting in particular stocks completely, the user can elect to do so, or to move the divested stocks into another folio, e.g., the holding folio, to hold until the user decides to sell, such as to wait until qualifying for capital gains treatment rather than ordinary income tax treatment.

As time progresses, the user might own securities in the holding folio that can be used to satisfy the purchase requirements of a newly revised folio from the manager. The user can specify that the system look first into the holding folio of the individual user before purchasing any securities when "rebalancing" to the newly revised folio from the manager. This might occur if a stock were removed from the manager's folio and then later added back, or removed from one managed folio owned by the user and subsequently added to another managed folio owned by the user.

Based upon the length of time the individual securities are held, there can be considerable savings from not selling the securities specified by the manager at the time. Thus, transferring these securities internally to another folio, e.g., the holding folio, can save some users (e.g., those in high income brackets) money by enabling them to hold the securities for a time that enables the sale of these securities to qualify for capital gains tax treatment. Usually, mutual funds do not take such personal tax effects into account when determining whether to buy or sell a particular security. Thus, the present mechanism enables a user to obtain the benefits provided by professional management without the inherent disadvantages often resulting from such management. In fact, this mechanism allows a user to precisely control tax effects in a managed investment, which is not possible today.

Figure 3:
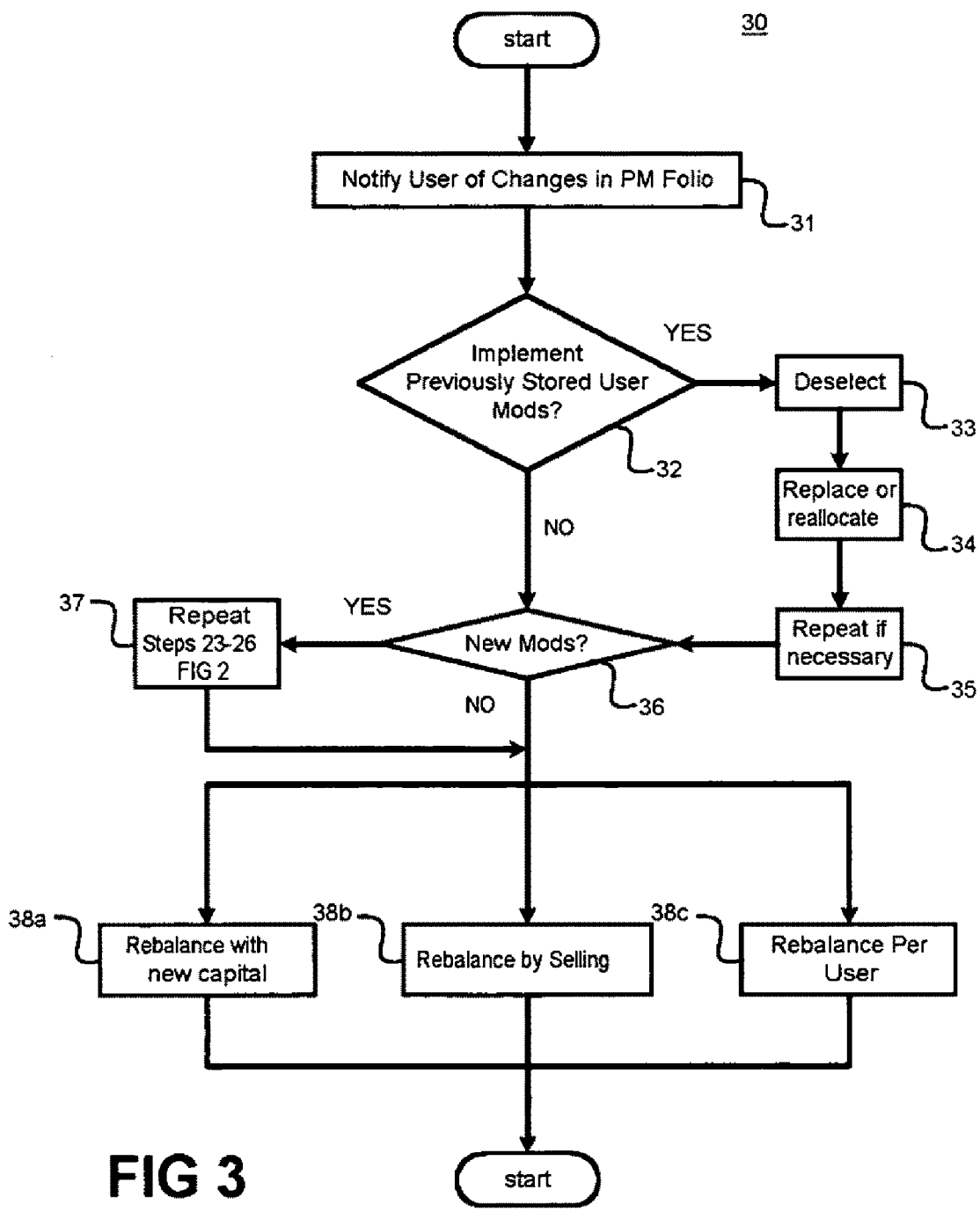
FIG. 3 depicts an exemplary embodiment of another method according to yet another aspect of the present invention for rebalancing to a revised recommended folio while incorporating previous user modifications.

FIG. 3 shows an exemplary embodiment of a process and/or method 30 for implementing changes to a manager's folio received from the manager. This example assumes that the manager's folio includes only stocks, however, as discussed above, any folio can contain any assets, rights or liabilities. At activity 31, upon receipt of any changes in the manager's folio, the system notifies all subscribers to the manager's folio. At activity 32, before making any changes, the system queries the user as to whether the user wishes to implement his or her previous modifications to the manager's folio. If so, at activities 33-35, the user's previously stored changes are made to the newly received folio.

At activity 36, the user is also asked whether the user wishes to make any new changes. If so, in activity 37 the system repeats activities 23-26 from FIG. 2. If there are no new changes, the process proceeds to rebalancing the user's existing portfolio to the manager's newly received (or newly modified) folio. This rebalancing can be performed, as discussed above, at activity 38a by rebalancing with new capital, or at activity 38b by rebalancing by selling, or at activity 38c by rebalancing in a manner selected by the user. The new ratios set in the manager's newly received (or newly modified) folio are compared to the current market values and the differences determine how much rebalancing is required. If there are some stocks missing in the manager's newly received (or newly modified) folio that are currently in the user's version of this folio, these stocks are sold (or moved to the holding folio). If some stocks are in the manager's newly received (or newly modified) folio but are not currently in the user's version of this folio, these stocks are purchased. Before purchasing any stocks, the system will look first to the user's holding folio, if any, and use those shares of the missing stocks in the holding folio before purchasing any new shares of these stocks.

The communications link to the manager can include an application program interface (API) to the portfolio manager system. This communications link can also include an Internet Protocol communications session between a computer (e.g., a server) disposed in the manager's system and a computer (e.g., a server) disposed in the portfolio manager system. These servers can communicate using, for example, HyperText Transfer Protocol (HTTP) or secure HTTP (HTTPS). The information can be transferred using a predetermined protocol, such as the Financial Information Exchange (FIX) protocol, eXtensible Markup Language (XML), etc.

During this session, the manager can create a portfolio of investments in the same manner as a user, except that the manager's folio does not necessarily include an amount to be invested. The manager can recommend that users invest more of their annual investment at certain times of the year and less at other times of the year based on market valuations, and/or other factors such as expected changes in interest rates, expected earnings announcements, and/or the manager's analysis of the outlook for the market. The manager's folio can suggest specific amounts to invest or percentages of annual investments to be spread across one's folio. These recommendations can be in the form of weighted buy/sell recommendations.

In addition, a user might prefer to not own certain stocks in the manager's folio. These stocks can be deselected from the user's version of the manager's folio when the user creates his or her folio. For example, when initially creating the folio, the user can specify certain stocks or securities, such as tobacco stocks, military stocks, etc., which are to be permanent removed from the user's version of this folio.

Thus, for example, when the user clicks on the manager's folio indicating that the user wishes to select that folio as an investment vehicle, the user then can be asked whether the user wants to modify this folio. If not, the process can proceed with asking the user how much the user wants to invest. If the user answers "YES" indicating the user wants to modify the folio, the user then can be allowed to deselect certain securities, select additional securities to be included, and/or revise the proportions. Each of these modifications can be stored in a "delta file" so that when the user later rebalances his folio to the manager's subsequently revised folio, the revised folio can be adjusted in accordance with the user's modifications. The system can store the modifications in the "delta file" and then, after rebalancing one's folio in accordance with the manager's folio revisions, implements the user's "standard" modifications.

As another example, if a user deselected tobacco stocks and put the money that would otherwise be invested in the tobacco stocks in pharmaceutical stocks (substituted for the tobacco stocks) the future revisions to the user's folio could be treated similarly. The amount of money otherwise invested in the tobacco stocks could be invested in the stock or stocks as specified by the user, or spread across the other stocks within the folio in equal proportions or some other proportion specified by the user, such as for example, market capitalization ratios.

Rebalancing

As the values of the individual securities change relative to each other and the amounts invested in the individual securities change relative to their initially specified proportions, users can "rebalance" their folio back to the originally specified proportions. This can be accomplished in at least one of several ways.

First, the user can sell some securities and purchase others with the proceeds. This approach, however, might create a taxable event. Hence, some users might prefer not to take this approach, at least during a period when they are trying to grow their investments. For those investors managing tax-free accounts, such as Individual Retirement Accounts (IRAs) or similar accounts, however, creating taxable events might not be a concern.

Second, the user can invest new funds into the folio, which are used to purchase more of the securities whose values are such that the amount invested in these securities is below the required (or desired) proportions. This approach has the benefit of not causing a taxable event, however, it requires an infusion of capital, which might or might not be convenient. Moreover, depending upon the variance between a user's current proportions and his or her preferred proportions, the amount needed to rebalance could be significant.

For example, in a portfolio of equally-balanced stocks, to rebalance one's portfolio requires an investment (A) of at least $nP_n - P_T$ where n is the number of different stocks, $P_T$ is the current market value of the folio, and $P_n$ is the current market value of the nth stock, where the nth stock is the stock currently having the highest current market value. Assuming a folio market value of $10,000 (i.e., $P_T=\$10,000$) invested across ten stocks (i.e., n=10) and the amount of the nth stock is $5000 (i.e., $P_n=\$5000$), then the amount required to rebalance the folio to the original specifications is A=10×$5000−$10,000=$40,000. Thus, for a folio that has become significantly out of balance, the investment needed to correct the allocation of the folio can be substantial.

Third, a user can both invest additional capital and sell some securities. This can have both of the disadvantages discussed above.

Continual Rebalancing

For those investors who make small but periodic investments, the rebalancing might present certain difficulties. For example, the investor might wish to avoid creating taxable events, but might not have sufficient funds to invest at a particular time to bring the investor's folio into line with the initially specified ratios. For these users, the system can permit the investor to select a "continually rebalance" option. When in this mode, the system can automatically invest more funds in the stocks that have the lowest current market value ratios relative to the current market value of the folio until all the stocks are at the user-specified ratios.

Figure 4:
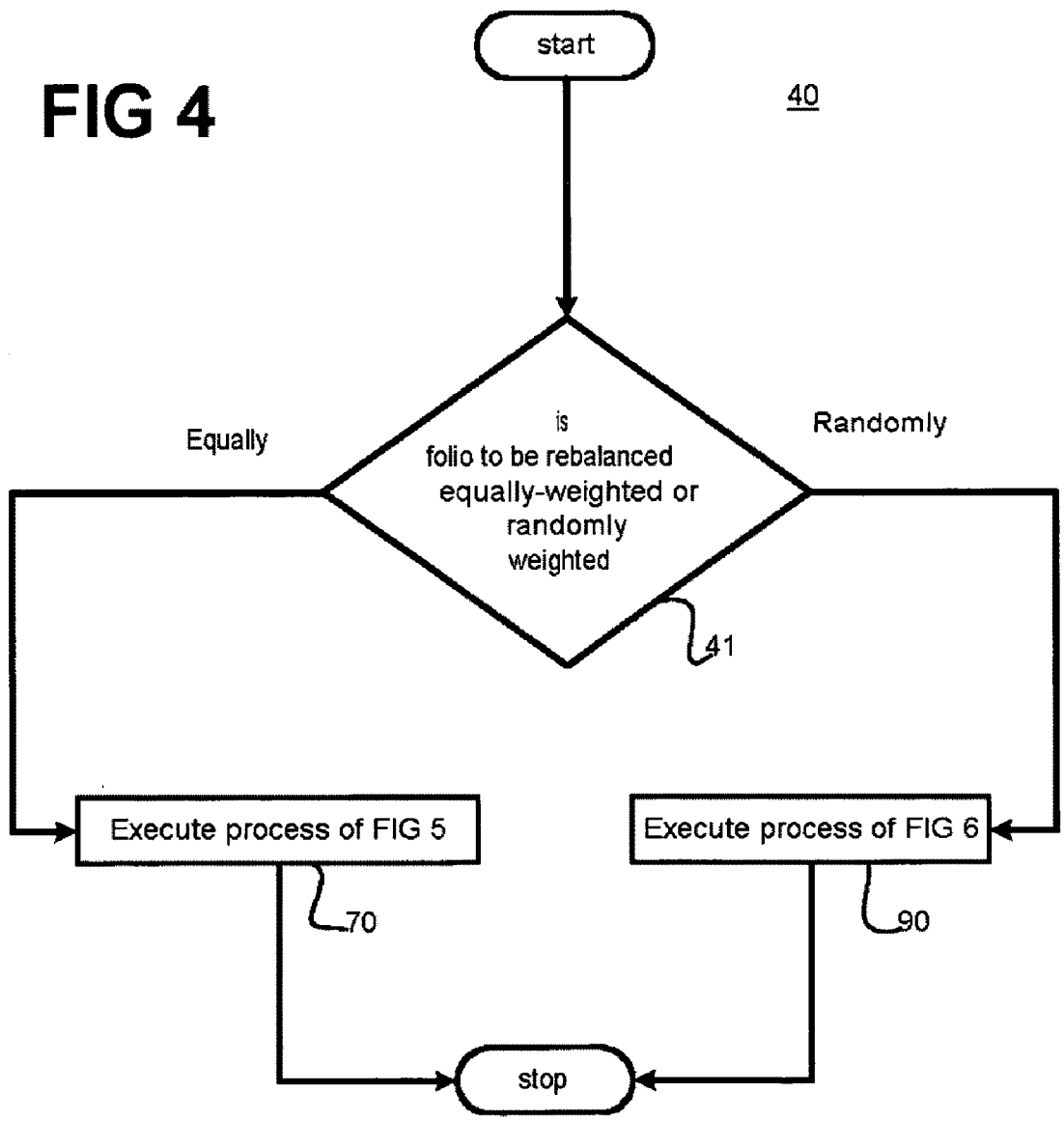
FIG. 4 depicts an exemplary embodiment for continuously rebalancing equally-weighted folios and randomly-weighted folios according to yet another aspect of the present invention.

Turning to FIG. 4, shown therein is a method 40 for rebalancing both equally-weighted and randomly weight folios. First, the folio to be rebalanced is determined to be either equally-weighted or randomly-weighted 41. If equally-weighted, the process flow moves to the process 70 shown in FIG. 5. If randomly-weighted, the process flow moves to the process 90 shown in FIG. 6.

Continual Rebalancing When the Proportions are Equal

Figure 5:
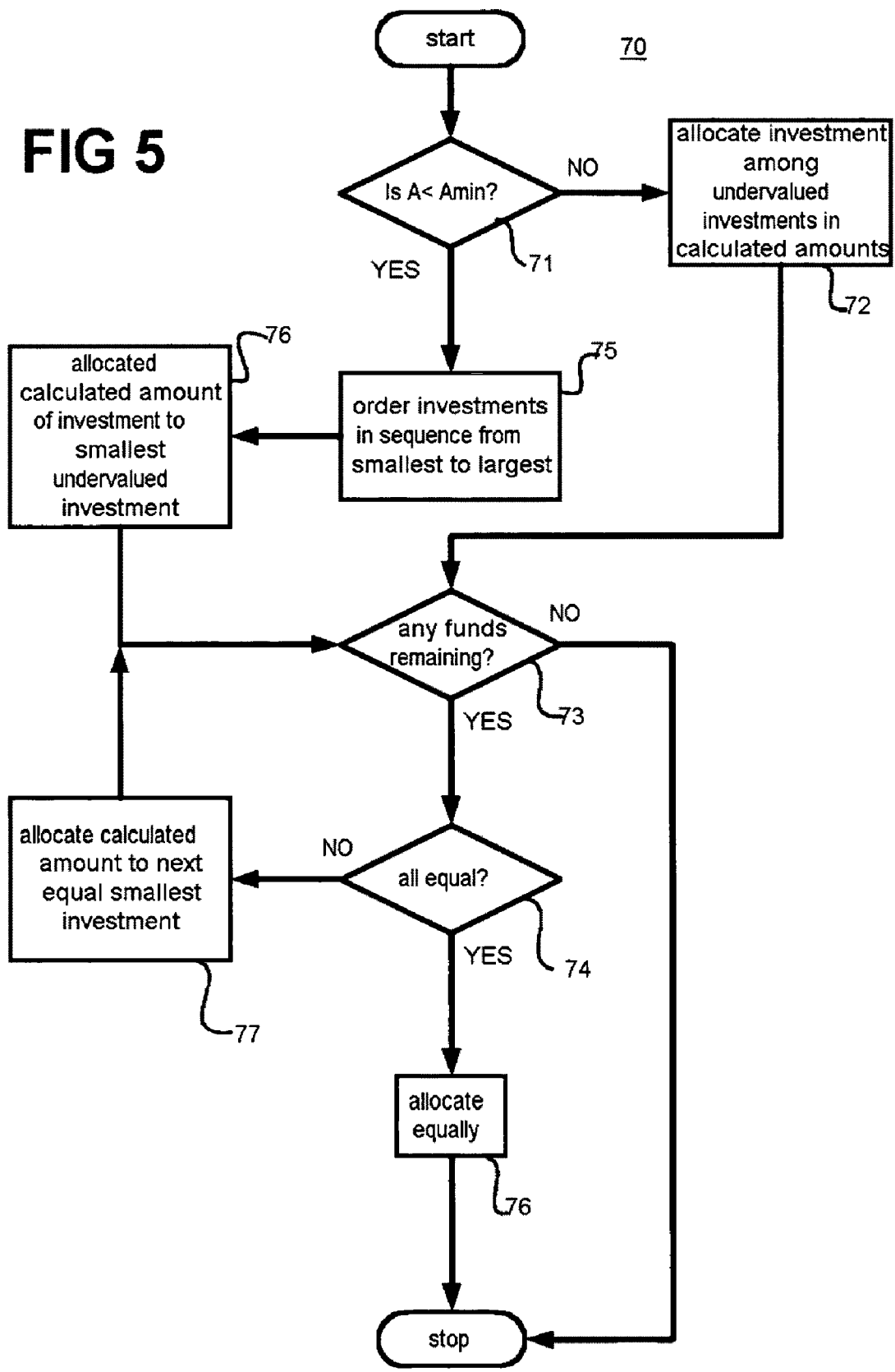
FIG. 5 depicts another exemplary embodiment for continuously rebalancing equally-weighted folios according to yet another aspect of the present invention.

Turning to FIG. 5, shown therein is an exemplary embodiment of a process and/or method 70 for rebalancing a folio that was originally specified to be equally proportioned. Consider the case in which a user owns stocks in a given folio and wishes for the current market value (i.e., the current market price per share times the number of shares) of each different stock to be equal, but has less than $$A_{min} = P_T - \frac{m}{n}\sum_{i=1}^{n} P_i$$

to invest per cycle, where $A_{min}$ is the minimum amount to invest to equalize the current market values of the different stocks, $P_T$ is the current market value of the total folio, m is the number of different stocks in the folio, n is the number of under-represented stocks, and $P_i$ is the current market value of each of the ith stocks that are under-represented. If the user has at least $A_{min}$ to invest, the user simply allocates $$I_i = \frac{1}{m}(P_T + A_{min}) - P_i$$

to each of the ith under-represented stocks. Any remaining funds (i.e., any amounts over $A_{min}$) are then allocated to each of the stocks in equal proportions.

Thus, at activity 71, process 70 determines first whether the amount to invest $A_i$ equals $A_{min}$, the required minimum for balancing the current market values of the different stocks, where $A_{min}$ is described by the following equation:

$$A_{min} = P_T - \frac{m}{n}\sum_{i=1}^{n} P_i.$$

If so, at activity 72 the amount $A_{min}$ is allocated among n under-represented stocks by investing $I_{min}$ in each in accordance with the following equation:

$$I_i = \frac{1}{m}(P_T + A_{min}) - P_i.$$

Next, at activity 73 the process determines whether there are any funds remaining. If not, the process ends. If there are funds remaining in activity 73, the process then determines if all investments are equal 74. If so, the process allocates them in equal proportions among all the stocks in activity 76, and the process ends.

If the amount is not equal or greater than the required minimum in activity 71, at activity 75 the process then orders the current market values of the under-represented stocks from smallest to largest. Next, at activity 76 the process allocates a portion ($I_1$) of the amount to invest ($A_i$) to the under-represented stock having the smallest current market value, where $I_1 = P_2 - P_1$, where $P_1$ and $P_2$ are the two stocks having the smallest current market values, respectively. If this difference is zero, the process moves to activity 73 without allocating any portion of the amount to invest ($A_i$) in activity 76. If the portion ($I_1$) to be allocated is greater than the amount to invest ($A_i$), then the entire amount to invest ($A_i$) is allocated to the stock having the smallest current market value and the process ends.

Next, the process determines whether there are any funds remaining to invest 73. If there are no funds remaining to invest, the process ends. If there are any funds remaining to invest, at activity 74 the process first determines whether the folio is balanced. If so, at activity 76 the process allocates the remaining funds ($A_1 - I_1$) equally among all the stocks in the folio. If the folio remains unbalanced, at activity 77 the process allocates a portion ($I_2$) of the remaining funds ($A_i - I_1$) to the stocks now having the smallest and equal current market values, which should be at least two stocks in accordance with the following equation:

$$I_2 = P_{i+1} - P_i$$

where $P_i$ is the stock now having the smallest current market value and $P_{i+1}$ is the stock having the next smallest current market value that is not equal to $P_i$. If the remaining funds to invest ($A_1 - I_1$) are less than $I_2$, the process allocates the remaining funds in equal proportions to the stocks having the smallest equal current market values and then stops. After the investment allocation in activity 76, the process returns to activity 73 to determine if there are any funds remaining to invest. If not, the process stops. If so, the process moves to activity 74.

If there are funds remaining to invest ($A_i - I_1 - I_2$) after activity 73, the process repeats activity 77 for the stocks having the next smallest and equal current market values, until there are no more funds to invest or the amounts are equal in all stocks, or the amount to invest in the last activity does not equal the amount required, in which cases the process stops. In the latter case, at activity 77 the process allocates the amount remaining at this point among the stocks having the smallest and equal current market values before stopping.

As an example of process 70, consider a folio of ten stocks. Initially, the current market value of each stock represented 10% of the current market value of the folio. In other words, the ratio of the current market value of each stock to the current market value of the folio was 10%, which will be referred to as the current market value ("CMV") ratio of the stock. After some time, due to price changes, the ten stocks have the following CMV ratios:

| Stock 1  | 1%  |
|----------|-----|
| Stock 2  | 2%  |
| Stock 3  | 2%  |
| Stock 4  | 5%  |
| Stock 5  | 10% |
| Stock 6  | 10% |
| Stock 7  | 15% |
| Stock 8  | 15% |
| Stock 9  | 20% |
| Stock 10 | 20% |

To rebalance this folio, the following steps can occur:

Step 1: In this case, if the user had selected the continually rebalance folio, the user's funds (at the next investment cycle) would be allocated to Stock 1 until the CMV or CMV ratio of Stock 1 equals the CMV or CMV ratio of Stock 2 (note: when the folio is equally proportioned, the CMV's of all the stocks will be equal, and the CMV ratios of all the stocks will be equal). Alternatively, prospective CMV ratios can be used. One way of calculating a prospective CMV ratio is to determine the ratio of the current market value of the stock to the combination of the current market value of the folio and the amount to be invested. Another way of calculating the prospective CMV ratio is to determine the ratio of the current market value of the stock to the combination of the current market value of the folio and the investment amount thus far allocated in the rebalancing process. No matter which type of CMV ratio is utilized, Stock 1 represents the general case of a stock having the lowest CMV ratio, and Stock 2 represents the general case of a stock having the next lowest CMV ratio.

To express this rebalancing process symbolically, let,
$P_T$=previous folio current market value
$P_n$=current market value for stock n
$I_i$=investment amount to be invested in step i
$R_{ni}$=CMV ratio for stock n during step i
Then, $$P_T = \sum_n P_n \quad R_{n0} = \frac{P_n}{P_T} \quad R_{ni} = \frac{P_n + I_i}{P_T + I_i}$$

and so, we have:

$$R_{11} = \frac{P_1 + I_1}{P_T + I_1}$$

which equals (after step 1)

$$R_{21} = \frac{P_2}{P_T + I_1}.$$

After solving, R11=R21, and thus, we have $I_1=P_2-P_1$, which means we invest an amount into Stock 1 equal to the difference between the smallest CMV ratio and next smallest CMV ratio. If there were more than one stock with the same lowest CMV ratio, we would invest in the stocks with the lowest CMV ratios in equal proportions until reaching the amount of money currently invested in the stock with the next lowest CMV ratio.

Step 2: If any funds remained to be invested, the additional funds would be allocated to the new stocks (e.g., stocks 1, 2 and 3) having the lowest CMV ratios in equal proportions until they reached the CMV ratios of the new next lowest stocks (e.g., stock 4). In other words, the amount to invest in this step 2, $I_2$, equals the difference between the CMV of stock 4 (the next lowest stock) and the CMV of the current lowest stocks (stocks 1, 2 and 3) or $I_2=P_4-P_3$ (as $P_1=P_2=P_3$).

Step 3: If any funds remained to be invested, step 2 would be repeated until the CMV ratios were equal for all the stocks, at which point if any funds remain to be invested, the funds would be allocated equally to all stocks in the folio.

If in any step, the amount of funds remaining is less than the amount necessary to fund that step, the amount of funds remaining is allocated among the stocks having the smallest CMV ratios in equal proportions.

Continually Rebalancing When the Proportions Are Unequal

A somewhat similar process can be used when the proportions are not equal. In this case, the system determines those stocks that have the largest difference $(R_i-A_i)$ between the specified CMV ratio $(R_i)$ and the actual CMV ratio $(A_i)$. The system then orders these differences to create an ordered sequence of the differences, the largest being first in the sequence. Once this sequencing is complete, the system can begin the allocation process as follows:

Step 1: The system can allocate funds from the amount to be invested until equalizing a difference between the stock having the largest difference and the stock having the next largest difference. If there are two or more stocks having the largest differences, then the system skips to step 2.

Representing this process symbolically, let $*_1$=the stocks having the largest difference and $*_2$=the stock having the next largest difference. Then, we wish to invest an amount $I_1$ in step A so that the differences are such that $*_1=*_2$. Letting $R_1$, $R_2$=the desired CMV ratios of the first and second stocks, respectively, and $A_1$, $A_2$=the actual CMV ratios of the first and second stocks, respectively, then we have:

$$R_1-A_1=R_2-A_2.$$

Letting $P_1$, $P_2$=the values of the first and second stocks, respectively and $P_T$=the folio CMV currently (before $I_1$), we have:

$$R_1 - \frac{P_1+I_1}{P_T+I_1} = R_2 - \frac{P_2}{P_T+I_1}.$$

Solving for $I_1$ we have:

$$I_1 = \frac{R_1 P_T - P_1 - R_2 P_T + P_2}{1 - R_1 + R_2}.$$

Thus, we invest $I_1$ in the first stock. If any funds remain, we move to step 2. After step 1, the amounts invested in the first and second stocks will be such that the differences between the desired CMV ratios and the actual CMV ratios are equal for the two stocks having the largest differences between their actual and desired CMV ratios.

For example, assuming a current folio CMV of $10,000 ($P_T$), a desired CMV ratio for the first stock of 20% ($R_1$), an actual CMV of the first stock is $1000 ($P_1$), a desired CMV ratio for the second stock of 10% (R2) and an actual CMV of the second stock of $750 ($P_2$), and solving for $I_1$ we obtain:

$$I_1 = \frac{(0.20 \cdot \$10{,}000) - \$1000 - (0.10 \cdot \$10{,}000) + \$750}{1 - 0.20 + 0.10} = \$833.33$$

So, we allocate $833.33 into the first stock, which makes the prospective CMV of the first stock equal to $1833.33, and the prospective CMV of the folio equal to 10,833.33, which makes the prospective CMV ratio of the first stock=$1833.33/$10,833.33=16.92% (having a difference of 3.08% from the specified CMV ratio of 20%). Note that the second stock's prospective CMV ratio is now $750/$10,833.33=6.92% (which also has a difference of 3.08% from the specified CMV ratio of 10%).

Step 2: We now assume the more general case, where we now have two or more stocks with equal differences between their specified and actual CMV ratios. The differences are ordered by largest values, positive to negative, where a positive difference implies that the particular stock is underfunded relative to its specified CMV ratio, where a zero difference implies that the particular stock is funded at its specified CMV ratio, and where a negative difference implies that the particular stock is currently overfunded relative to its specified CMV ratio. By allocating to correct the largest differences each time, the negative differences will ultimately disappear as the stocks with positive differences are further funded and the ones with negative differences are not. When the differences for all stocks that originally had positive differences become zero, then the stocks with originally negative differences will also be zero.

In this case, we shall assume there are n stocks with equal differences, and in this step 2 we are to split the amount to be invested (12) across the n stocks. Note that n must be such that n<m, where m is the number of stocks. If n=m, then the proper allocation among the stocks is their specified allocations, because if n=m all the stocks have the same difference between their specified CMV ratios and their actual CMV ratios, which can only be the case if the differences are zero (as the differences must add to zero). Of course, n can never be larger than m.

We first define the following:

$$I_2=I_{21}+I_{22}+\ldots+I_{2i}+\ldots+I_{2n}$$

where $I_{2i}$ represents the amount to be invested in step 2 in the ith stock among the n stocks having the largest equal differences between their user specified CMV ratios and their actual CMV ratios in the plurality of stocks.

We then select these values for $I_{2i}$ such that the following is true:

$$R_1-A_1=R_{n+1}-A_{n+1}$$

$$R_2-A_2=R_{n+1}-A_{n+1}$$

$$\ldots=R_{n+1}-A_{n+1}$$

$$R_i-A_i=R_{n+1}-A_{n+1}$$

$$\ldots=R_{n+1}-A_{n+1}$$

$$R_n-A_n=R_{n+1}-A_{n+1}$$

In other words, we calculate the individual amounts (for each of the n stocks) of the total amount to be invested in this step 2 ($I_2$) so that the difference between the actual CMV ratios and the desired CMV ratios of these n stocks is the same and now equal to the next largest (under-represented) difference (the n+1th under-represented stock). To do so, we know that:

$$A_i = \frac{P_i + I_{2i}}{P_T + I_2}$$

which is a function of two unknowns, $I_2$ and $I_{2i}$. We also know:

$$A_{n+1} = \frac{P_{n+1}}{P_T + I_2}$$

because the n+1$^{th}$ stock will have no funds added to it by definition as its difference is less than the other stocks' differences. Thus, we have essentially, n+1 equations (i.e., the n equations above and $I_2 = I_{21} + I_{22} + \ldots + I_{2i} + \ldots + I_{2n}$) and n+1 unknowns ($I_{21}$ through $I_{2n}$ and $I_2$). We can solve the following for $I_{2i}$:

$$Ri - \frac{P_i + I_{2i}}{P_T + I_2} = R_{n+1} - \frac{P_{n+1}}{P_T + I_2}$$

which becomes:

$$I_{2i} = R_i(P_T + I_2) - P_i - R_{n+1}(P_T + I_2) + P_{n+1}$$

and substitute $I_{2i}$ into:

$$I_2 = I_{21} + I_{22} + \ldots + I_{2i} + \ldots + I_{2n}$$

which reduces to:

$$I_2 = \frac{\sum_{i=1}^{n}(P_i - P_{n+1}) - P_T(R_i - R_{n+1})}{1 - \sum_{i=1}^{n}(R_i - R_{n+1})}$$

Then, using the following, we can solve for the other remaining stocks in this step.

$$I_{2i} = R_i(P_T + I_2) - P_i - R_{n+1}(P_T + I_2) + P_{n+1}$$

Continuing with our example, after step 1:
$P_1 = \$1833.33$
$P_2 = \$750.00$
$P_3 = \$400$
$P_T = \$10,833.33$
n=2
$R_1 = 0.20$
$R_2 = 0.10$
$R_3 = 0.05$
Substituting these values into the above equation for 12 results in:
$I_2 = \$479.17$ $A_1 = 18.54\%$
$I_{21} = \$263.55$ $A_2 = 8.54\%$
$I_{22} = \$215.63$ $A_3 = 3.54\%$
$P_1 = \$2096.88$ *$_1 = 1.46$
$P_2 = \$965.63$ *$_2 = 1.46$
$P_3 = \$400$ *$_3 = 1.46$
$P_T = \$11,312.50$ Step 3: The system keeps repeating step 2 until all funds to be invested are allocated, or until the differences are all equal, in which case the system then allocates the remaining funds to be invested in accordance with their respective CMV ratios, e.g., $R_i$/sum over all $R_i$. The differences cannot be all equal and zero, as the system would otherwise have rebalanced immediately based on the minimum amount needed to rebalance as set forth below. Therefore, the best one can achieve without meeting the required minimum to rebalance is to equalized the ratio differences for all of the under-represented stocks to a nonzero amount. However, continued application of this process over several periodic payments will eventually lead to a rebalanced portfolio.

Figure 6:
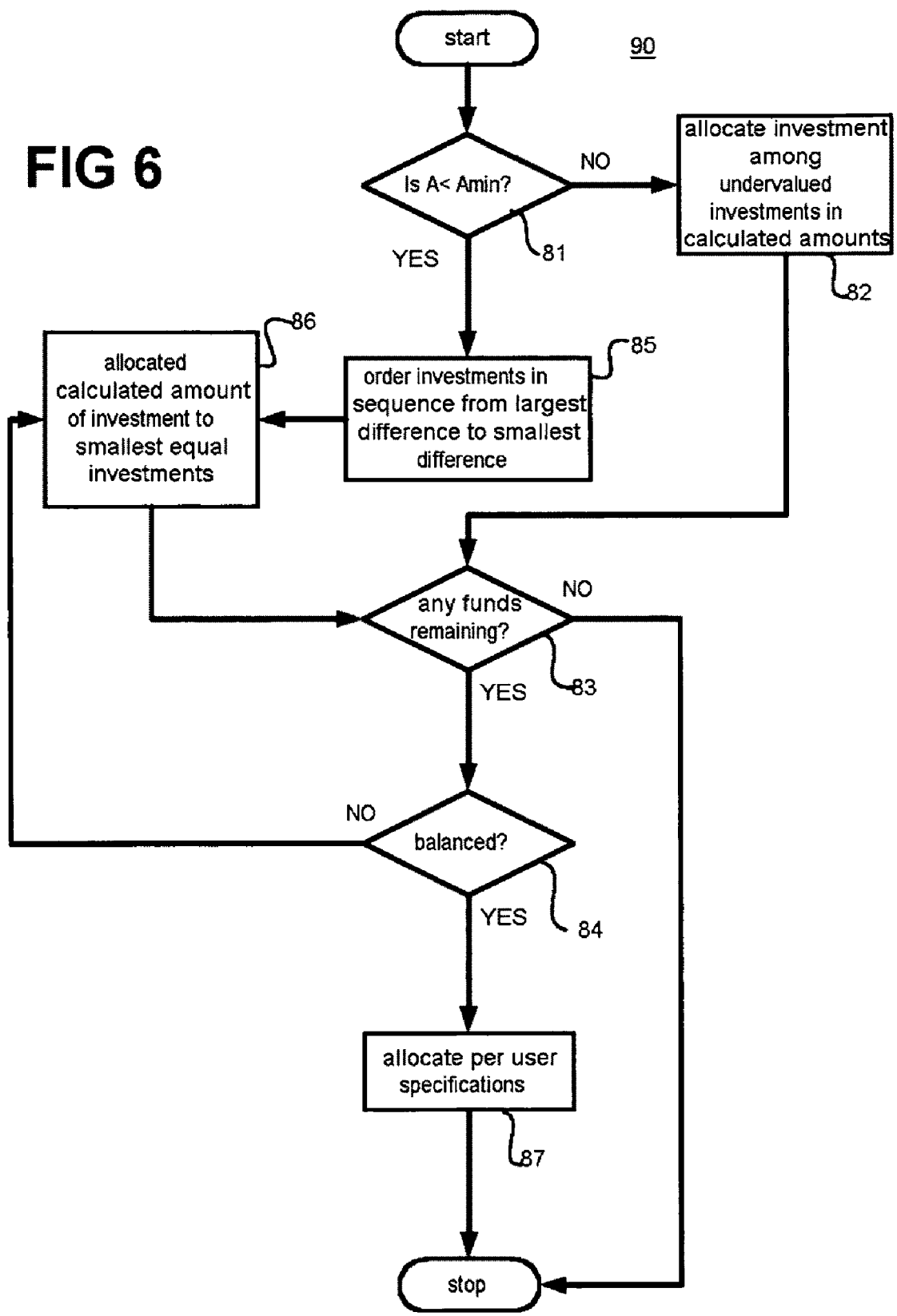
FIG. 6 depicts yet another exemplary embodiment for continuously rebalancing randomly-weighted folios according to yet another aspect of the present invention.

Turning to FIG. 6, shown therein is an exemplary embodiment of a process and/or method 90 for rebalancing an unequally weighted (or randomly weighted) folio. Of course, this process can also be used for an equally weighted folio.

First, at activity 81 the process tests whether the amount to invest (A) equals the amount needed to rebalance the folio (Amin):

$$I = \frac{\sum_{i=1}^{k}(R_i P_T - P_i)}{1 - \sum_{i=1}^{k} R_i}.$$

If so, at activity 82 the process allocates an amount (I) among the k under-represented stocks in accordance with the following equation:

$$I_i = R_i(P_T + I) - P_i$$

Next, at activity 83 the process tests whether there are any funds remaining to be invested (A−I), and ends if not. If there are funds remaining to be invested, at activity 87 (after performing a balance test 84, which if fails the process moves to activity 86) the process allocates the remaining funds in accordance with the user's specifications, as the folio is now balanced, and then ends.

If the amount to invest (A) is less than the required amount calculated in activity 81, at activity 85 the process orders the stocks in a sequence from those having the largest difference between their user-specified CMV ratio and their actual CMV ratio. Next, at activity 86 the process allocates an amount $I_1$ among the n stocks having the smallest equal differences in accordance with the following equations:

$$I_1 = \frac{\sum_{i=1}^{n}(P_i - P_{n+1}) - P_T(R_i - R_{n+1})}{1 - \sum_{i=1}^{n}(R_i - R_{n+1})}$$

$$I_{1i} = R_i(P_T + I_1) - P_i - R_{n+1}(P_T + I_1) + P_{n+1}.$$

If the required amount to invest ($I_1$) is less than the amount remaining, the process allocates the amount remaining in relative proportion to the stocks having the smallest equal differences based on their relative weightings, e.g., $R_i$/sum of all $R_i$, and then ends.

At activity 83, if there are any funds remaining to be invested, the process continues to activity 84 where it determines if the folio is balanced. If there are funds remaining to be invested and the folio is balanced, at activity 87 the process allocates the remaining funds in accordance with the user specified CMV ratios, and then ends. This activity is probably not reachable, as failing the initial test for the minimum amount precludes this amount of money being available to completely balance the portfolio. If there are funds remaining to be invested and the folio is not balanced (the more likely event), the process returns to activity 86, selecting the stocks having the next smallest and equal differences.

Thus, the system first determines the differences between the actual CMV ratios and the desired CMV ratios of all the investments, orders the differences from largest to zero (ignores the rest). The system then performs the calculation in step A, which represents the amount necessary to equalize the two largest differences. If the calculated amount is less than the user's amount to be invested, the system allocates the funds to be invested as set forth in step A above. If the calculated amount is more than the user's amount to be invested, the system allocates the entire amount to be invested to the stock having the largest difference.

The system next calculates the amount to equalize the two largest differences to the three largest differences. If the calculated amount is less than the amount remaining to be invested, the system allocates the funds to the individual stocks in accordance with the calculations in step B. If the calculated amount is more than the amount remaining to be invested, the system allocates the remaining funds between the two stocks in proportion to their respective CMV ratios. For example, if the first stock has a desired ten percent ratio and the second stock has a desired twenty percent ratio, the system allocates ⅓ of the amount to be invested to the first stock and ⅔ of the amount to be invested to the second stock. If there are more than two stocks, the proportionality factors can be ($R_i$/sum of all $R_i$). At the end of step B, if there are funds remaining to be invested, then at least three of the stocks will have the same largest differences. The system keeps repeating step B until all of the differences are equal. If the differences are not zero at this point, the system then allocates the remaining funds to be invested in proportion to their respective CMV ratios. At this point, the amount required to bring all of the remaining equal differences to zero is:

$$I_3 = \frac{\sum_{i=1}^{n}(R_i P_T - P_i)}{1 - \sum_{i=1}^{n} R_i}$$

and the individual amounts to be invested are:

$$I_i = R_i(P_T + I_3) - P_i.$$

It is noteworthy that if the initial amount to be invested equals or exceeds $I_3$, then the above steps can be skipped and the account rebalanced in one step. But that is the easy case. Any funds remaining would then be invested in accordance with the user's original specifications.

Of course, the method for rebalancing a randomly weighted folio could be applied to an equally balanced folio.

SUMMARY

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of specific communication techniques and protocols between various embodiments, any communication technique will suffice to transfer information regarding the manager's folio. Furthermore, these examples should not be interpreted to limit the modifications and variations of the invention covered by the claims but are merely illustrative of possible variations.

What is claimed is:

1. A computer implemented method for allocating funds across a portfolio of assets/rights/liabilities, said portfolio including at least two assets/rights/liabilities, comprising:
    investing periodically an amount of money in the portfolio using a computerized portfolio investment system;
    continually automatically rebalancing the portfolio using a processor for each of the periodic investments so that the portfolio remains as close as possible to user specified ratios for each of the assets/rights/liabilities in the portfolio after each periodic investment, wherein said rebalancing includes:
        allocating by the processor a first portion of each of the periodic investment amounts to one or more assets/rights/liabilities in the portfolio having a maximum difference between an user specified ratio and an actual ratio;
        second allocating by the processor a second portion of each of the periodic investment amounts to one or more assets/rights/liabilities in the portfolio having a maximum difference between the user specified ratio and the actual ratio after allocation of the first portion; and
        determining by the processor whether the portfolio is balanced after allocation of the first and second portions, and allocating any funds remaining of said each of the periodic investments according to the user specified ratios if the portfolio is balanced.

2. The computer implemented method according to claim 1, further comprising determining by the processor a minimum amount necessary to rebalance the portfolio.

3. The computer implemented method according to claim 2, further comprising allocating by the processor a first portion of said each of the periodic investments equal to the minimum amount in accordance with a predetermined formula, if said each of the periodic investments equals or exceeds the minimum amount.

4. The computer implemented method according to claim 3, further comprising allocating by the processor any funds remaining after allocating the first portion in accordance with user specified ratios.

5. The computer implemented method according to claim 3, wherein the predetermined formula includes:

$$I_i = R_i(P_T + I) - P_i$$

$$I = \frac{\sum_{i=1}^{n}(R_i P_T - P_i)}{\sum_{i=1}^{n} R_i}$$

where $I_i$, represents an amount to allocate to an ith under-represented asset/right/liability in the portfolio of assets/rights/liabilities, $R_i$ represents a user specified ratio for the ith under-represented asset/right/liability, $P_T$ represents a current total value of the user's portfolio, $P_i$ represents a current value of the ith under-represented asset/right/liability, and I represents the minimum amount necessary to rebalance the portfolio.

6. The computer implemented method according to claim 1, wherein the first portion ($I_1$) is calculated by the processor according to the following equations:

$$I_1 = \frac{\sum_{i=1}^{n}(P_i - P_{n+1}) - P_T(R_i - R_{n+1})}{1 - \sum_{i=1}^{n}(R_i - R_{n+1})}$$

$$I_{1i} = R_i(P_T + I_1) - P_i - R_{n+1}(P_T + I_1) + P_{n+1}$$

where $I_{1i}$ represents an amount to allocate to an ith under-represented asset/right/liability among n under-represented assets/rights/liabilities having equal differences between their user specified ratios and their actual ratios in the portfolio of assets/rights/liabilities, $R_i$ represents a user specified ratio for the ith under-represented asset/right/liability, $R_{n+1}$ represents a user specified ratio for the n+1th under-represented asset/right/liability, $P_T$ represents a current total value of the user's portfolio of assets/rights/liabilities, $P_i$, represents a current value of the ith under-represented asset/right/liability, $P_{n+1}$ represents a current value of the n+1th under-represented asset/right/liability, and $I_1$ represents the first portion.

7. The computer implemented method according to claim 5, wherein the first portion ($I_1$) is calculated by the processor according to the following equations:

$$I_1 = \frac{\sum_{i=1}^{n}(P_i - P_{n+1}) - P_T(R_i - R_{n+1})}{1 - \sum_{i=1}^{n}(R_i - R_{n+1})}$$

$$I_{1i} = R_i(P_T + I_1) - P_i - R_{n+1}(P_T + I_1) + P_{n+1}$$

where $I_{1i}$ represents an amount to allocate to an ith under-represented asset/right/liability among n under-represented assets/rights/liabilities having equal differences between their user specified ratios and their actual ratios in the portfolio of assets/rights/liabilities, $R_i$ represents a user specified ratio for the ith under-represented asset/right/liability, $R_{n+1}$ represents a user specified ratio for the n+1th under-represented asset/right/liability, $P_T$ represents a current total value of the user's portfolio of assets/rights/liabilities, $P_i$ represents a current value of the ith under-represented asset/right/liability, $P_{n+1}$ represents a current value of the n+1th under-represented asset/right/liability, and $I_1$ represents the first portion.

8. The computer implemented method according to claim 1, wherein the second portion ($I_2$) is calculated by the processor according to the following equations:

$$I_2 = \frac{\sum_{i=1}^{n}(P_i - P_{n+1}) - P_T(R_i - R_{n+1})}{1 - \sum_{i=1}^{n}(R_i - R_{n+1})}$$

$$I_{2i} = R_i(P_T + I_1) - P_i - R_{n+1}(P_T + I_1) + P_{n+1}$$

where $I_{2i}$ represents an amount to allocate to an ith under-represented asset/right/liability among n under-represented assets/rights/liabilities having equal differences between their user specified ratios and their actual ratios in the portfolio, $R_i$ represents a user specified ratio for the ith under-represented asset/right/liability, $R_{n+1}$ represents a user specified ratio for the n+1th under-represented asset/right/liability, $P_T$ represents a current total value of the user's portfolio, $P_i$ represents a current value of the ith under-represented asset/right/liability, $P_{n+1}$ represents a current value of the n+1th under-represented asset/right/liability, and $I_2$ represents the second portion.

9. The computer implemented method according to claim 5, wherein the second portion ($I_2$) is calculated by the processor according to the following equations:

$$I_2 = \frac{\sum_{i=1}^{n}(P_i - P_{n+1}) - P_T(R_i - R_{n+1})}{1 - \sum_{i=1}^{n}(R_i - R_{n+1})}$$

$$I_{2i} = R_i(P_T + I_1) - P_i - R_{n+1}(P_T + I_1) + P_{n+1}$$

where $I_{2i}$ represents an amount to allocate to an ith under-represented asset/right/liability among n under-represented assets/rights/liabilities having equal differences between their user specified ratios and their actual ratios in the portfolio, $R_i$ represents a user specified ratio for the ith under-represented asset/right/liability, $R_{n+1}$ represents a user specified ratio for the n+1th under-represented asset/right/liability, $P_T$ represents a current total value of the user's portfolio, $P_i$ represents a current value of the ith under-represented asset/right/liability, $P_{n+1}$ represents a current value of the n+1th under-represented asset/right/liability, and $I_2$ represents the second portion.

10. The computer implemented method according to claim 7, wherein the second portion ($I_2$) is calculated by the processor according to the following equations:

$$I_2 = \frac{\sum_{i=1}^{n}(P_i - P_{n+1}) - P_T(R_i - R_{n+1})}{1 - \sum_{i=1}^{n}(R_i - R_{n+1})}$$

$$I_{2i} = R_i(P_T + I_1) - P_i - R_{n+1}(P_T + I_1) + P_{n+1}$$

where $I_{2i}$ represents an amount to allocate to an ith under-represented asset/right/liability among n under-represented assets/rights/liabilities having equal differences between their user specified ratios and their actual ratios in the portfolio, $R_i$ represents a user specified ratio for the ith under-represented asset/right/liability, $R_{n+1}$ represents a user specified ratio for the n+1th under-represented asset/right/liability, $P_T$ represents a current total value of the user's portfolio, $P_i$ represents a current value of the ith under-represented asset/right/liability, $P_{n+1}$ represents a current value of the n+1th under-represented asset/right/liability, and $I_2$ represents the second portion.

11. A computer implemented method for investing in a portfolio of assets/rights/liabilities, said portfolio including at least two assets/rights/liabilities, comprising:
 establishing by a user using a graphical user interface a desired ratio for each asset/right/liability in the portfolio, wherein the desired ratios specify for each asset/right/liability a desired value of said each asset/right/liability relative to a total value of the portfolio;
 investing by a user using the graphical user interface periodically an amount of money in the portfolio; and continually automatically rebalancing by a processor the portfolio of assets/rights/liabilities for each of the periodic investments so that the portfolio remains as close as possible to user desired ratios for each of the assets/rights/liabilities in the portfolio of assets/rights/liabilities after each of the periodic investments, wherein said rebalancing includes:
  allocating by the processor a first portion of each of the periodic investment amounts to one or more assets/rights/liabilities in the portfolio having a maximum difference between a user desired ratio and an actual ratio;
  allocating by the processor a second portion of each of the periodic investment amounts to one or more assets/rights/liabilities in the portfolio having a maximum difference between the user desired ratio and the actual ratio after allocation of the first portion; and
  determining by the processor whether the portfolio is balanced after allocation of the first and second portions, and allocating by the processor any funds remaining of said each of the periodic investments according to the user desired ratios if the portfolio is balanced.

12. The computer implemented method according to claim 11, further comprising determining by the processor a minimum amount necessary to rebalance the portfolio and allocating by the processor a first portion of said each of the periodic investments equal to the minimum amount in accordance with a predetermined formula, if said each of the periodic investments equals or exceeds the minimum amount.

13. The computer implemented method according to claim 12, further comprising allocating by the processor any funds remaining after allocating the first portion in accordance with user desired ratios.

14. The computer implemented method according to claim 13, wherein the predetermined formula includes:

$$I_i = R_i(P_T + I) - P_i$$

$$I = \frac{\sum_{i=1}^{n}(R_i P_T - P_i)}{\sum_{i=1}^{n} R_i}$$

where $I_i$ represents an amount to allocate to an ith under-represented asset/right/liability in the portfolio of assets/rights/liabilities, $R_i$ represents a user specified ratio for the ith under-represented asset/right/liability, $P_T$ represents a current total value of the user's portfolio, $P_i$ represents a current value of the ith under-represented asset/right/liability, and I represents the minimum amount necessary to rebalance the portfolio.

15. The computer implemented method according to claim 11, wherein the first portion ($I_1$) is calculated by the processor according to the following equations:

$$I_1 = \frac{\sum_{i=1}^{n}(P_i - P_{n+1}) - P_T(R_i - R_{n+1})}{1 - \sum_{i=1}^{n}(R_i - R_{n+1})}$$

$$I_{1i} = R_i(P_T + I_1) - P_i - R_{n+1}(P_T + I_1) + P_{n+1}$$

where $I_{1i}$ represents an amount to allocate to an ith under-represented asset/right/liability among n under-represented assets/rights/liabilities having equal differences between their user specified ratios and their actual relative ratios in the portfolio of assets/rights/liabilities, $R_i$ represents a user specified ratio for the ith under-represented asset/right/liability, $R_{n+1}$ represents a user specified ratio for the n+1th under-represented asset/right/liability, $P_T$ represents a current total value of the user's portfolio of assets/rights/liabilities, $P_i$ represents a current value of the ith under-represented asset/right/liability, $P_{n+1}$ represents a current value of the n+1th under-represented asset/right/liability, and $I_1$ represents the first portion.

16. The computer implemented method according to claim 14, wherein the first portion ($I_1$) is calculated by the processor according to the following equations:

$$I_1 = \frac{\sum_{i=1}^{n}(P_i - P_{n+1}) - P_T(R_i - R_{n+1})}{1 - \sum_{i=1}^{n}(R_i - R_{n+1})}$$

$$I_{1i} = R_i(P_T + I_1) - P_i - R_{n+1}(P_T + I_1) + P_{n+1}$$

where $I_{1i}$ represents an amount to allocate to an ith under-represented asset/right/liability among n under-represented assets/rights/liabilities having equal differences between their user specified ratios and their actual relative ratios in the portfolio of assets/rights/liabilities, $R_i$ represents a user specified ratio for the ith under-represented asset/right/liability, $R_{n+1}$ represents a user specified ratio for the n+1th under-represented asset/right/liability, $P_T$ represents a current total value of the user's portfolio of assets/rights/liabilities, $P_i$ represents a current value of the ith under-represented asset/right/liability, $P_{n+1}$ represents a current value of the n+1th under-represented asset/right/liability, and $I_1$ represents the first portion.

17. The computer implemented method according to claim 11, wherein the second portion ($I_2$) is calculated by the processor according to the following equations:

$$I_2 = \frac{\sum_{i=1}^{n}(P_i - P_{n+1}) - P_T(R_i - R_{n+1})}{1 - \sum_{i=1}^{n}(R_i - R_{n+1})}$$

$$I_{2i} = R_i(P_T + I_1) - P_i - R_{n+1}(P_T + I_1) + P_{n+1}$$

where $I_{2i}$ represents an amount to allocate to an ith under-represented asset/right/liability among n under-represented assets/rights/liabilities having equal differences between their user specified ratios and their actual ratios in the portfolio, $R_i$ represents a user specified ratio for the ith under-represented asset/right/liability, $R_{n+1}$ represents a user specified ratio for the n+1th under-represented asset/right/liability, $P_T$ represents a current total value of the user's portfolio, $P_i$ represents a current value of the ith under-represented asset/right/liability, $P_{n+1}$ represents a current value of the n+1th under-represented asset/right/liability, and $I_2$ represents the second portion.

18. The computer implemented method according to claim 14, wherein the second portion ($I_2$) is calculated by the processor according to the following equations:

$$I_2 = \frac{\sum_{i=1}^{n}(P_i - P_{n+1}) - P_T(R_i - R_{n+1})}{1 - \sum_{i=1}^{n}(R_i - R_{n+1})}$$

$$I_{2i} = R_i(P_T + I_1) - P_i - R_{n+1}(P_T + I_1) + P_{n+1}$$

where $I_{2i}$ represents an amount to allocate to an ith under-represented asset/right/liability among n under-represented assets/rights/liabilities having equal differences between their user specified ratios and their actual ratios in the portfolio, $R_i$ represents a user specified ratio for the ith under-represented asset/right/liability, $R_{n+1}$ represents a user specified ratio for the n+1 th under-represented asset/right/liability, $P_T$ represents a current total value of the user's portfolio, $P_i$ represents a current value of the ith under-represented asset/right/liability, $P_{n+1}$ represents a current value of the n+1th under-represented asset/right/liability, and $I_2$ represents the second portion.

19. The computer implemented method according to claim 18, wherein the second portion ($I_2$) is calculated by the processor according to the following equations:

$$I_2 = \frac{\sum_{i=1}^{n}(P_i - P_{n+1}) - P_T(R_i - R_{n+1})}{1 - \sum_{i=1}^{n}(R_i - R_{n+1})}$$

$$I_{2i} = R_i(P_T + I_1) - P_i - R_{n+1}(P_T + I_1) + P_{n+1}$$

where $I_{2i}$ represents an amount to allocate to an ith under-represented asset/right/liability among n under-represented assets/rights/liabilities having equal differences between their user specified ratios and their actual ratios in the portfolio, $R_i$ represents a user specified ratio for the ith under-represented asset/right/liability, $R_{n+1}$ represents a user specified ratio for the n+1th under-represented asset/right/liability, $P_T$ represents a current total value of the user's portfolio, $P_i$ represents a current value of the ith under-represented asset/right/liability, $P_{n+1}$ represents a current value of the n+1th under-represented asset/right/liability, and $I_2$ represents the second portion.

20. A computer-readable medium storing instructions that, when executed by one or more processors, cause the one or more processors to perform activities for allocating funds across a portfolio of assets/rights/liabilities, said portfolio including at least two assets/rights/liabilities, comprising:
  investing periodically an amount of money in the portfolio; and
  continually rebalancing by one of the one or more processors the portfolio for each of the periodic investments so that the portfolio remains as close as possible to user specified ratios for each of the assets/rights/liabilities in the portfolio after each periodic investment, wherein said rebalancing includes:
    allocating by one of the one or more processors a first portion of each of the periodic investment amounts to one or more assets/rights/liabilities in the portfolio having a maximum difference between a user desired ratio and an actual ratio;
    allocating by one of the one or more processors a second portion of each of the periodic investment amounts to one or more assets/rights/liabilities in the portfolio having a maximum difference between the user desired ratio and the actual ratio after allocation of the first portion; and
    determining by one of the one or more processors whether the portfolio is balanced after allocation of the first and second portions, and allocating by one of the one or more processors any funds remaining of said each of the periodic investments according to the user desired ratios if the portfolio is balanced.

* * * * *

UNITED STATES PATENT AND TRADEMARK OFFICE
CERTIFICATE OF CORRECTION

PATENT NO.         : 8,086,514 B2                                    Page 1 of 1
APPLICATION NO.    : 12/378495
DATED              : December 27, 2011
INVENTOR(S)        : Steven M. H. Wallman It is certified that error appears in the above-identified patent and that said Letters Patent is hereby corrected as shown below:

Title Page, please add:

--(63) Domestic Priority data
        This application is a CON of 10/306,625 filed 11/27/2002--

Signed and Sealed this
Fifth Day of June, 2012

David J. Kappos
*Director of the United States Patent and Trademark Office*